Aug. 12, 1952 H. C. MEAD ET AL 2,606,772
COMBINED TAIL LAMP AND FUEL TANK INLET COVER
Filed Feb. 21, 1949 3 Sheets-Sheet 2
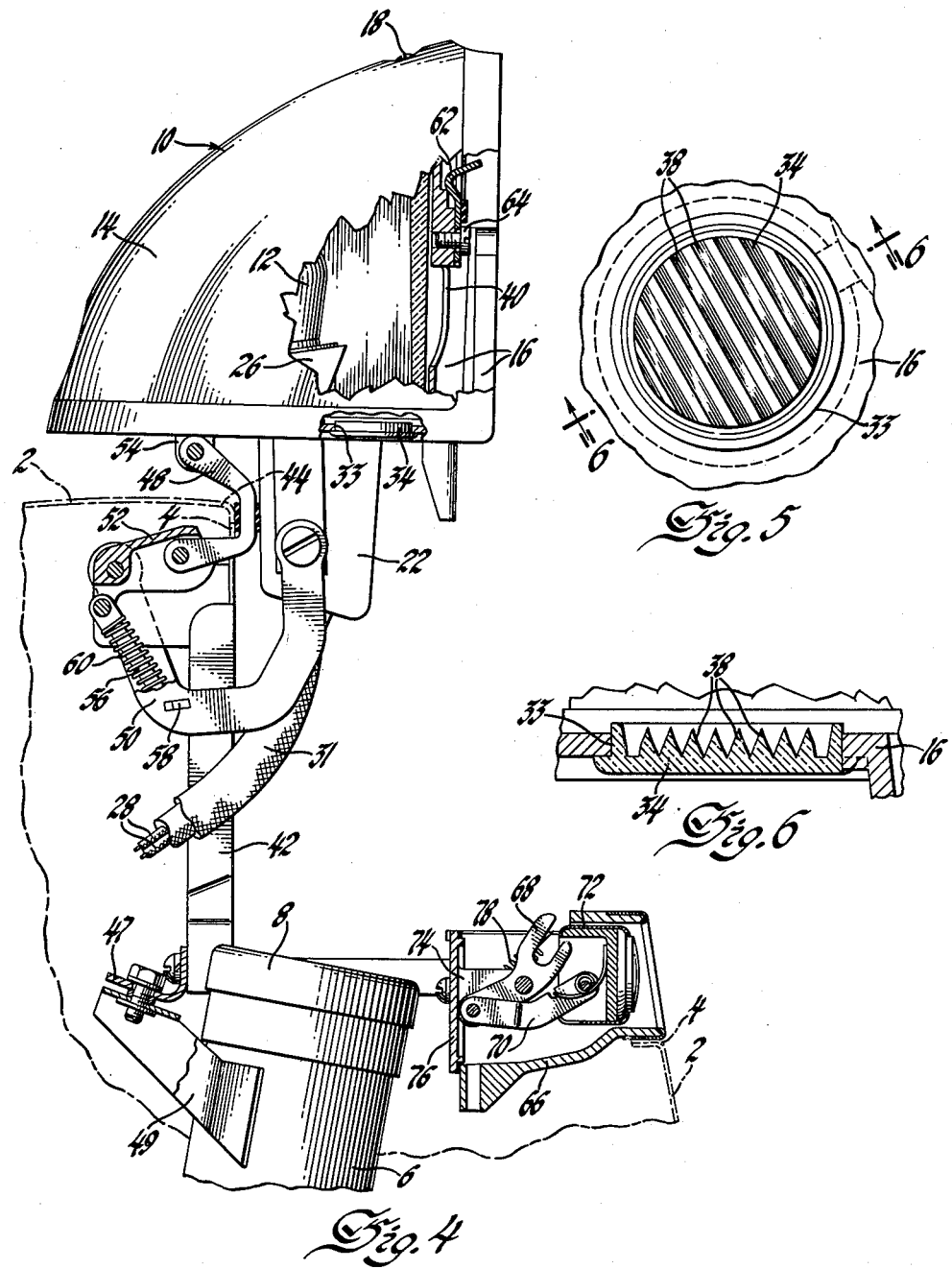
Inventors
Howard C. Mead &
George W. Onksen, Jr.
By Spencer, Willits, Helwig, Baillio
Attorneys

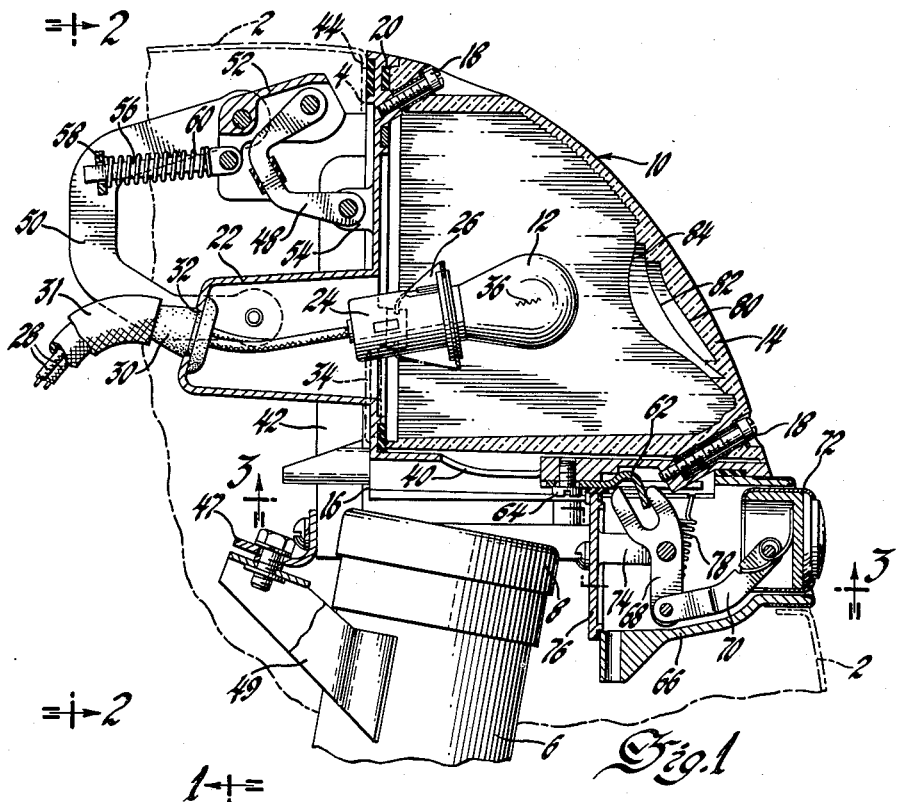

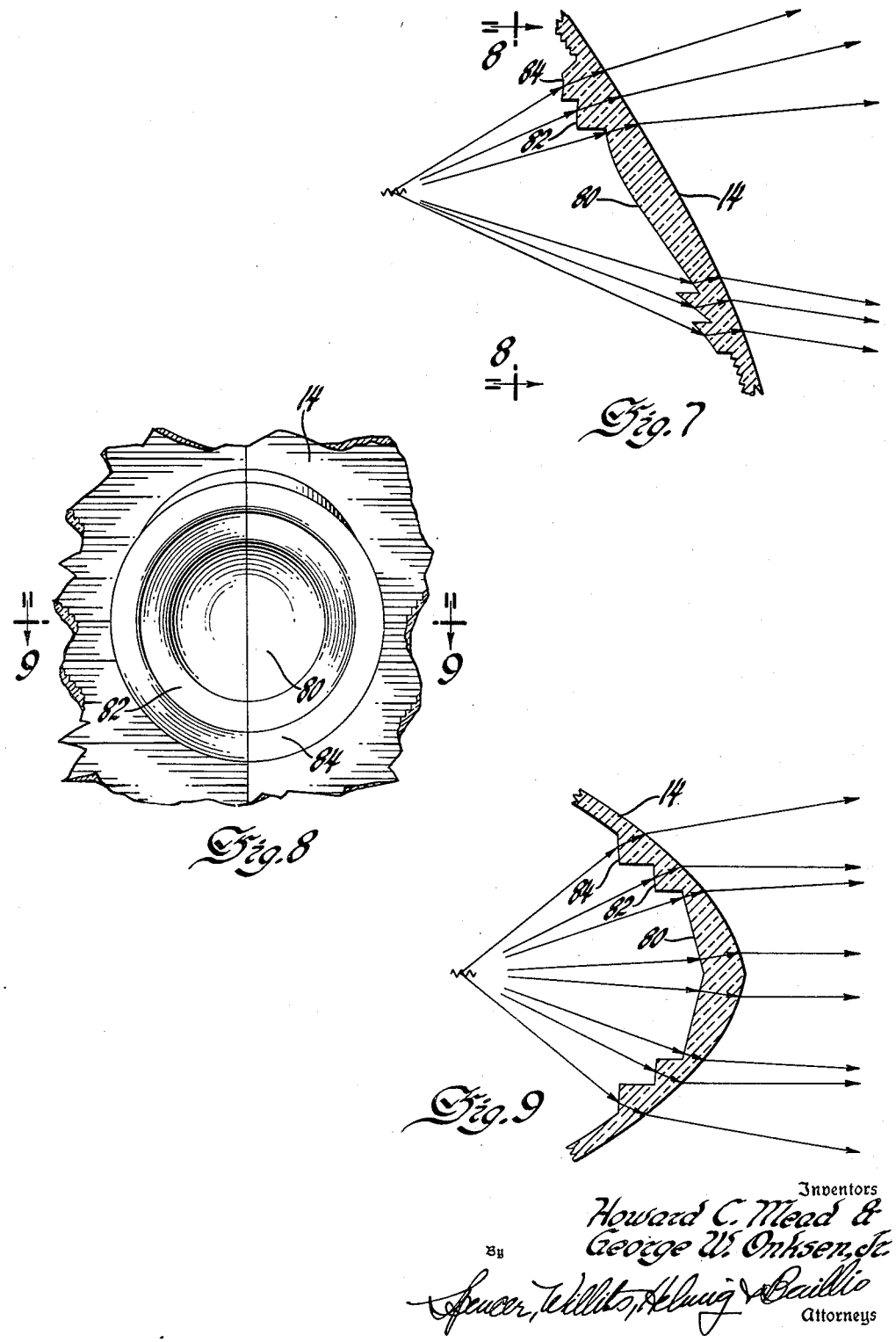

Patented Aug. 12, 1952

2,606,772

UNITED STATES PATENT OFFICE 2,606,772

COMBINED TAIL LAMP AND FUEL TANK INLET COVER

Howard C. Mead and George W. Onksen, Jr., Anderson, Ind., assignors to General Motors Corporation, Detroit, Mich., a corporation of Delaware Application February 21, 1949, Serial No. 77,494

3 Claims. (Cl. 280—152)

The present invention relates to closures for vehicles and more particularly to movable tail lamp structures adapted to be supported in an automobile body to cover a gasoline tank fuel inlet.

It is an object of the present invention to provide an improved automobile tail lamp and fuel tank inlet cover assembly.

It is another object to provide an automobile tail lamp and cover assembly having means to support the assembly in an opening in the body structure with an external surface of the lamp forming a continuous part of surface of the body and having a movable mounted lamp housing serving to conceal the fuel tank inlet so it will not detract from the streamline contour of the body.

Still another object is to provide an automobile tail lamp and cover assembly having means which will provide illumination for the fuel tank inlet when the cover assembly is opened to uncover the inlet and additional means for directing a signal light rearwardly of the vehicle from the opened position.

Still another object is to provide concealed hinging and latching means for the lamp housing permitting an upward hinged movement of the lamp housing away from its body contacts to uncover the inlet.

Still another object is to provide a tail lamp lens having suitable light directing characteristics while having an external surface designed to form a part of a continuous streamlined body surface.

Further objects and advantages of the invention will become apparent as the following description proceeds and the features of novelty which characterize the invention will be pointed out with particularity in the claims annexed to and forming a part of this specification.

For a better understanding of the invention, reference may be had to the accompanying drawings in which Figure 1 is a view taken along the line 1—1 of Figure 2 illustrating the tail lamp and cover assembly embodying the present invention mounted in the rear fender of an automobile adjacent the fuel inlet; Figure 2 is a view taken along the line 2—2 of Figure 1; Figure 3 is a view taken along the line 3—3 of Figure 1; Figure 4 is a view similar to Figure 1 illustrating the tail lamp housing displaced to uncover the gasoline tank inlet; Figure 5 is a plan view of a fragmentary section of the lamp housing containing a light directing lens for illuminating the inlet when the lamp housing is displaced to uncover the inlet; Figure 6 is a view taken along the line 6—6 of Figure 5; Figure 7 is a partial view in section and partly broken away of the tail lamp signalling lens; Figure 8 is a view taken along the line 8—8 of Figure 7 and Figure 9 is a view taken along the line 9—9 of Figure 8.

Referring now to the drawings and particularly to Figures 1 and 4, there is illustrated a rear portion 2 of an automobile with an opening 4 of sufficient size and location to provide convenient access to the fuel tank inlet pipe 6. While the opening may be located in any convenient part of the body structure, it is preferred that the inlet pipe be located so that access to the pipe is obtained through an opening in the fender structure. A removable cap 8 is provided for closing the inlet pipe and its details of construction along with the inlet pipe 6 being well known need not be described here in detail.

Pivotally mounted in the opening 4 is a housing 10 adapted to house an electric lamp 12 and provide a cover for the inlet pipe 6 of the fuel tank. The housing comprises a lens 14 and a support 16 to which the lens is attached by threaded members 18. To provide for sealing the interior of the housing against the admission of water, a gasket 20 is interposed between the lens and the upwardly extending wall of the support.

The support 16 is formed with perpendicularly disposed walls, the external edges of which are arched to conform to the fender contours defined by the opening 4. The upwardly extending wall of the support is provided with an integral enclosure 22 extending oppositely of the supported lens 14 in which a lamp socket 24 is partially recessed. The lamp socket is mounted in the housing by a bracket 26 which is resiliently secured to the upwardly extending wall of the support on opposite sides of enclosure 22 by threaded members, not shown. An electrical circuit to the lamp 12 is established by lead-in wires 28 connected to the terminals of the lamp socket and entering the enclosure 22 through a rubber grommet 30 disposed in an aperture 32 in the end of the enclosure. The rubber grommet is adapted to be recessed in the cable sheath 31 surrounding the lead-in wires to prevent the introduction of moisture to the interior of the sheath and in addition forms a seal in the aperture 32 to make the interior of the housing 10 substantially weatherproof. Adjacent the enclosure 22 and offset from the vertical plane bisecting the housing and support, the upwardly extending wall of support 16 is provided with an aperture 33 shown in Figure 4, in which a light directing lens is positioned.

The lens 34 is provided to direct light from the lamp 12 onto the gasoline tank inlet pipe 6 when the pipe is uncovered and the housing is in the open position illustrated in Figure 4. As the lens is offset from the housing vertical midplane in which the source of light from filament 36 of the lamp 12 is located, parallel light bending prisms 38 are formed on one surface of the lens 34 as shown in Figures 5 and 6 to bend the light to illuminate the pipe 6 when the housing is in the open position. As it is considered desirable that a lamp adapted to serve as a gasoline inlet cover be provided with auxiliary signal means when tthe lamp housing is in the open position, the support 16 is provided with an aperture 40 which permits light to be directed through the aperture and rearwardly of the lamp when the inlet pipe is uncovered.

The lamp housing 10 is supported in the opening 4 by a frame member 42 attached to the inturned fender edges 44 outlining the fender opening 4. The frame member 42 is a die casting formed with perpendicularly disposed arched frames similar in form to the arched walls of support 16 and provided with bolt holes 46 for securing the frame to the inturned edges 44 of the fender opening. To provide additional support for the inlet pipe 6 in the fender opening, a support frame 49 welded to the inlet pipe is connected as shown in Figs. 1 and 4 by an angle bar 47 to the frame member 42. To provide for movement of the housing 10 to uncover the inlet pipe 6, the support 16 is pivotally connected to the frame member 42 by a hinge consisting of a connecting link 48 and a pair of parallel connecting links 50 shown connected respectively at their opposite ends to a flange 52 attached to the frame member 42 and the enclosure 22 and an ear 54 attached to the support 16. With the hinging links connected to the frame member 42 and support 16 in the manner shown and described, the movement of the lamp housing 10 to its open position is simultaneously outwardly and upwardly of the fender opening. To provide a restraining force for maintaining the housing at the extreme ends of its angular movement an overcenter spring mechanism is connected between the flange 52 and the parallel hinging links 50. The mechanism consists of a rod 56 pivotally connected at one end to the flange 52 and slidably connected at its other end to a yoke bar 58 extending between the parallel links 50. To provide an overcenter spring action, a compressed helical spring 60 is mounted on the rod 56 between the yoke bar 58 and the point of connection with the flange 52. With the housing in its position illustrated in Figure 1 the force of the spring acts on the yoke bar 58, to rotate the bar, links and housing about the connecting points on the flange 52 in a clockwise direction. As the housing is moved angularly from its closed position in a counterclockwise direction the direction of force acting on the housing is reversed due to the action of the overcenter mechanism and the force acts to move the housing counter-clockwise to its open position illustrated in Figure 4. In moving the housing from its open to its closed position the action of the overcenter mechanism is similar, providing a restraining force against clockwise movement initially and subsequently a force aiding clockwise movement to the closed position.

The lamp housing is provided with a striker plate 62 adapted to cooperate with an overcenter latching mechanism to lock the lamp housing in its closed position or initiate a counter-clockwise movement of the housing when it is desired to uncover the inlet pipe 6. The striker plate 62 is attached to the support 16 by a threaded member 64. The latching mechanism is enclosed in a housing 66 formed integrally with the frame member 42 and comprises a latch member 68 and a link 70 connected at one end to the latch member 68 and at its opposite end to a push button 72 slidably mounted in one end of the housing 66. The latch member 68 is provided with a bifurcated end for engaging the striker plate and is pivotally mounted at substantially its midpoint to a pair of arms 74 extending from the side of a cover plate 76 attached to the other end of the housing 66. To provide an overcenter spring action for the latching member 68, a pair of springs 78 are connected between the wall of enclosure 66 and the junction of latch member 68 and link 70, as shown.

With a latching mechanism such as that shown and described, an inward movement of the push button 72 is transformed through link 70 to impart a clockwise rotary movement to latching member 68 against the restraining force of springs 78. As the bifurcated end of the latching member moves clockwise its left-hand arm engages the striker plate forcing the lamp housing upwardly to permit the grasping of the housing edge for further movement to the open position. With a continuation of the clockwise movement of the latching member the force of springs 78 is first neutralized and then its direction is reversed to impart a force aiding clockwise rotation of the latching member until the connected end of the member strikes the plate 76 and is stopped. To move the housing to its closed position the housing is moved into the recess until the striker plate engages the left-hand arm of the bifurcated end. Continued movement of the housing to its closed position rotates the latching member counterclockwise against the restraining force of springs 78 until the connected end of the latching member is moved sufficiently to neutralize and reverse the direction of the restraining force. Thereafter the counterclockwise movement of the latching member is aided by the force of the springs 78 and the right-hand arm of the bifurcated end engages the striker plate forcing the housing to its closed position. With the housing in the closed position the force of the springs 78 acts to lock the housing in this position.

As illustrated in Figures 1 and 4 of the drawings the lens 14 is formed with an unsymmetrical shape in the vertical plane and a symmetrical shape in a plane substantially 90° disposed to it or in the horizontal plane so that the external surface of the lens will conform to the contour of the fender. In addition, the internal surface contour conforms generally to the external surface contour. With such surfaces being asymmetrical with respect to the focal axis of the lens the lens would not normally act to collimate the light rays from the filament source 36 of the lamp and the optical efficiency of the lamp as a signalling means would be unsatisfactory. Accordingly the lens is formed with a light collimating area surrounding the focal axis, see Figure 8, comprising the central dioptric condensing button 80 and the concentric dioptric condensing rings 82 and 84. As seen in the horizontal section in Figure 9 the light collimating area comprises two curved surfaces formed in different centers, one on each side of the vertical axis of the lens so that the inner surface of the light collimating area will be in dioptric agreement with the particular curve of the external surface formed at the nose of the lens. As seen in the vertical section in Figure 7 the internal surface of the light collimating area is formed on different radii along the vertical axis of the lens so that the surface will also be in dioptric agreement with the vertical projection of the unsymmetrical external surface. While the surfaces of the rings 82 and 84 are stepped with respect to the central button 80 it will be understood that they are formed in this manner because the section of the lens does not permit the forming of an unbroken surface. Surrounding the light collimating area the internal surface of the lens 14 is formed with horizontal flutes which diffuse light from the lamp source and are primarily for decoration purposes.

The internal surfaces of the lens 14 is formed by a male plunger provided with a removable plug having its exposed end formed to mold the light collimating surface hereinabove described. In this connection the plug comprises a pair of concentric cylinders adapted to form the rings 82 and 84 and a central concentric plug adapted to form the button 80.

While the embodiment of the present invention as herein disclosed, constitutes a preferred form, it is to be understood that other forms might be adapted, all coming within the scope of the claims which follow.

What we claim as new and desire to secure by Letters Patent of the United States is:

1. In a unitary tail light housing and gasoline tank inlet cover, a frame member provided with means for securing said frame member to an apertured portion of an automobile fender adjacent the inlet of the fuel tank, a lamp housing including a lamp and a lens thereover, means pivotally connecting the said lamp housing to the said frame member to swing the said lamp housing outwardly and upwardly of said frame member, a strike plate on said lamp housing, latching means including a pivoted bifurcated lever carried by said frame member and an overcenter spring mechanism, the said bifurcated lever swinging in one direction past center and engaging the strike plate to secure the lamp housing in its closed position against the frame member responsive to contact by the said strike plate, an operating button pivotally connected to the said bifurcated lever, the said bifurcated lever swinging in the other direction past center responsive to pushing the operating button whereby to release the said strike plate and initiate the opening of the lamp housing.

2. In a unitary tail light housing and gasoline tank inlet cover, a frame member provided with means for securing said frame member to an apertured portion of an automobile fender adjacent the inlet of the fuel tank, a lamp housing including a lamp and a lens thereover, a hinge comprising parallel acting links pivotally connecting the said lamp housing to the said frame member to swing the said lamp housing outwardly and upwardly of said frame member, an overcenter spring mechanism connected between the said frame and said links restraining the said housing at the extreme ends of its movement, a strike plate on said lamp housing, latching means including a pivoted bifurcated lever carried by said frame member and an overcenter spring mechanism, the said bifurcated lever swinging in one direction past center and engaging the strike plate to secure the lamp housing in its closed position against the frame member responsive to contact by the said strike plate, a slidable operating button pivotally connected to the said bifurcated lever, the said bifurcated lever swinging in the other direction past center responsive to manual pushing of the operating button whereby to release the said strike plate and initiate outward and upward movement of the lamp housing.

3. In a unitary tail light housing and cover over a gasoline tank inlet within the rear fender of an automobile cut away substantially vertically and horizontally at its upper corner, a frame member and means for securing the said frame to the apertured portion of the fender, a movable lamp housing including a lamp therein, a hinge composed of parallel acting links pivotally connecting the said lamp housing to the said frame member whereby to permit manual outward and upward movement of the said housing in respect to the said frame and an overcenter spring mechanism connected between the said frame and said hinge links restraining the said housing at the extreme ends of its hinged movement, a striker plate on said lamp housing, a pivoted bifurcated latch lever carried by the said frame member and a second overcenter spring mechanism connected between the said frame and the said latch lever, the said bifurcated latch lever being swingable past center in one direction responsive to one prong thereof being contacted by the striker plate on the lamp housing when closed against the frame member whereupon the other prong of the bifurcated latch lever engages the striker plate and locks the said lamp housing in its closed position, and a slidably mounted operating button linked to the said bifurcated latch lever urged outwardly by said lever when the lamp housing is closed, the said bifurcated latch lever being swingable past center in the other direction responsive to the pressing of the operating button whereupon the second mentioned prong of the bifurcated latch lever becomes disengaged from the striker plate and the first mentioned prong thereof contacts the said striker plate and initiates the outward and upward opening of the lamp housing.

HOWARD C. MEAD.
GEORGE W. ONKSEN, Jr.

REFERENCES CITED

The following references are of record in the file of this patent:

UNITED STATES PATENTS

| Number | Name | Date |
|---|---|---|
| 1,504,970 | Pascucci | Aug. 12, 1924 |
| 1,960,148 | Gage | May 22, 1934 |
| 2,023,393 | Alfred | Dec. 10, 1935 |
| 2,035,895 | Kelly | Mar. 31, 1936 |
| 2,054,919 | Anibal | Sept. 22, 1936 |
| 2,238,728 | Hadley et al. | Apr. 15, 1941 |
| 2,259,970 | Benzick | Oct. 21, 1941 |
| 2,314,710 | Keller | Mar. 23, 1943 |
| 2,325,648 | Barton | Aug. 3, 1943 |

FOREIGN PATENTS

| Number | Country | Date |
|---|---|---|
| 632,624 | Germany | July 10, 1936 |